United States Patent [19]

Berghauser et al.

[11] Patent Number: 4,969,270
[45] Date of Patent: * Nov. 13, 1990

[54] POWER DRIVEN SAW WITH RECIPROCATING SAW BLADES

[75] Inventors: Ulrich Berghauser, Taunusstein; Horst Grossmann, Hunfelden; Karl Schmid, Idstein; Ernst Staas, Brechen, all of Fed. Rep. of Germany

[73] Assignee: Black & Decker Inc., Newark, Del.

[*] Notice: The portion of the term of this patent subsequent to Jan. 17, 2006 has been disclaimed.

[21] Appl. No.: 116,803

[22] Filed: Oct. 30, 1987

[30] Foreign Application Priority Data

Nov. 11, 1986 [EP] European Pat. Off. ........ 86115652.9

[51] Int. Cl.⁵ ............................................. B27B 19/02
[52] U.S. Cl. ........................................ 30/369; 30/355; 30/392; 83/821
[58] Field of Search ................... 30/166 R, 355, 367, 30/392, 393, 394, 501, 502, 503; 83/746, 751, 848, 849, 850, 851, 821

[56] References Cited

U.S. PATENT DOCUMENTS

| | | | |
|---|---|---|---|
| 1,491,134 | 4/1924 | De Northall | 30/369 |
| 1,789,804 | 1/1931 | Broillet | 83/694 X |
| 2,534,001 | 12/1950 | Couse | 83/751 X |
| 2,784,751 | 3/1957 | Alexander | 143/68 |
| 2,840,125 | 6/1958 | Kirksey | 30/369 |
| 2,895,514 | 7/1959 | Wright | 30/394 |
| 3,716,916 | 2/1973 | Alexander | 30/369 |
| 4,665,618 | 5/1987 | Leini | 30/392 |
| 4,784,034 | 11/1988 | Stones et al. | 83/352 |
| 4,798,001 | 1/1989 | Grossmann et al. | 30/355 |

FOREIGN PATENT DOCUMENTS

| | | | |
|---|---|---|---|
| 3329824 | 8/1984 | Fed. Rep. of Germany . | |
| 332917 | 11/1958 | Switzerland . | |
| 2134038 | 8/1984 | United Kingdom | 30/369 |
| 2158770 | 11/1985 | United Kingdom . | |

Primary Examiner—Frank T. Yost
Assistant Examiner—Rinaldi Rada
Attorney, Agent, or Firm—Edward D. Murphy; Dennis A. Dearing; Edward D. C. Bartlett

[57] ABSTRACT

A power saw has two oppositely reciprocating saw blades guided and supported in a receiving slot in a support plate. The blades are supported during sawing along shoulders on their outside by lower edges of support sections of the support plate. The arrangement is such that forces generated in operation during cutting press the saw blades together in the area of their teeth. This prevents saw dust, chippings etc. penetrating between the two saw blades. Preferably, the thickness of the saw blade shoulders are not greater than half the thickness of the saw blades, and preferably no greater than the thickness of the support section edges. The teeth of the saw blades may be so ground and arranged that the resultant force on the teeth during cutting also forces the saw blades together at their teeth.

23 Claims, 9 Drawing Sheets

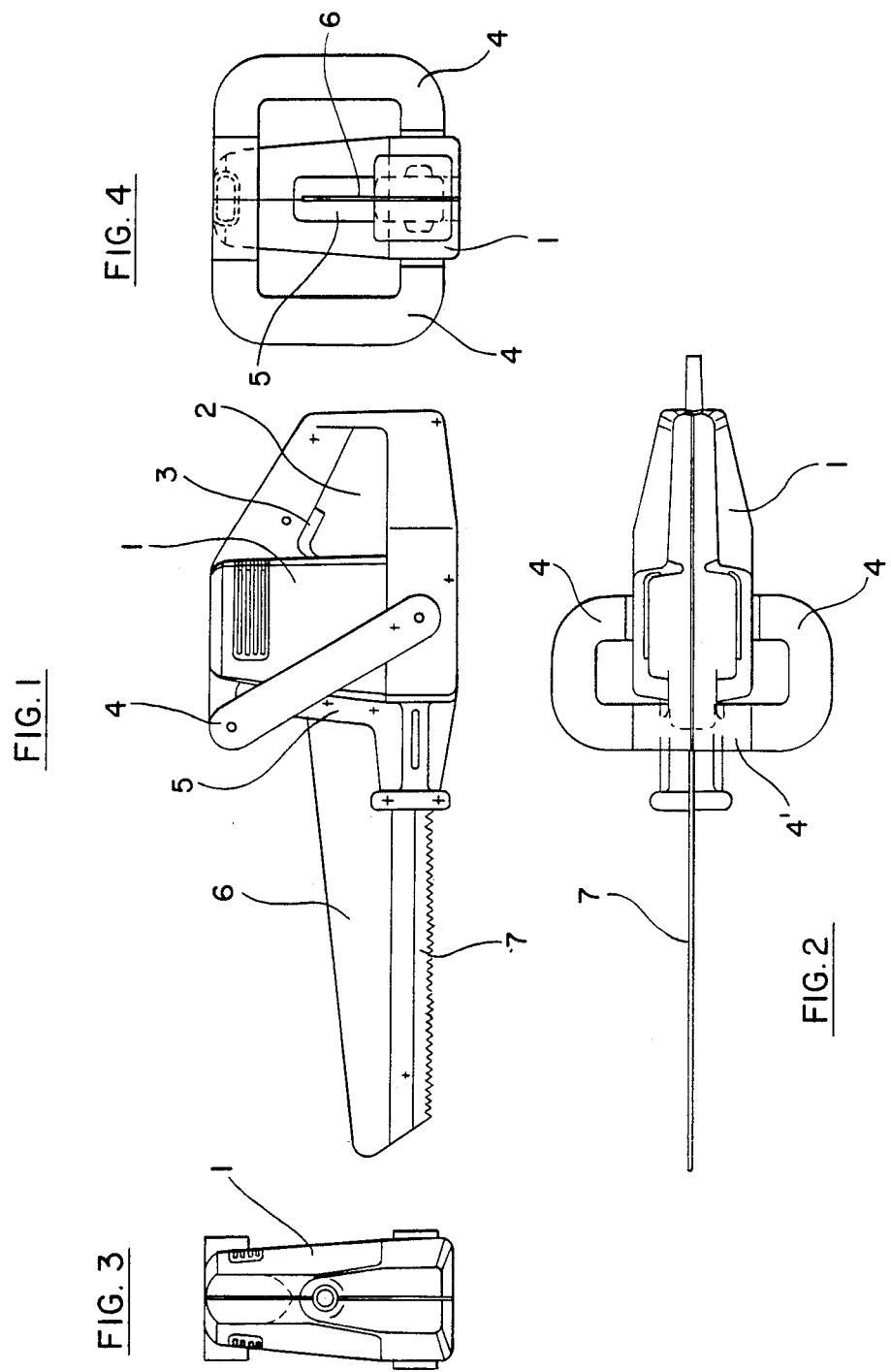

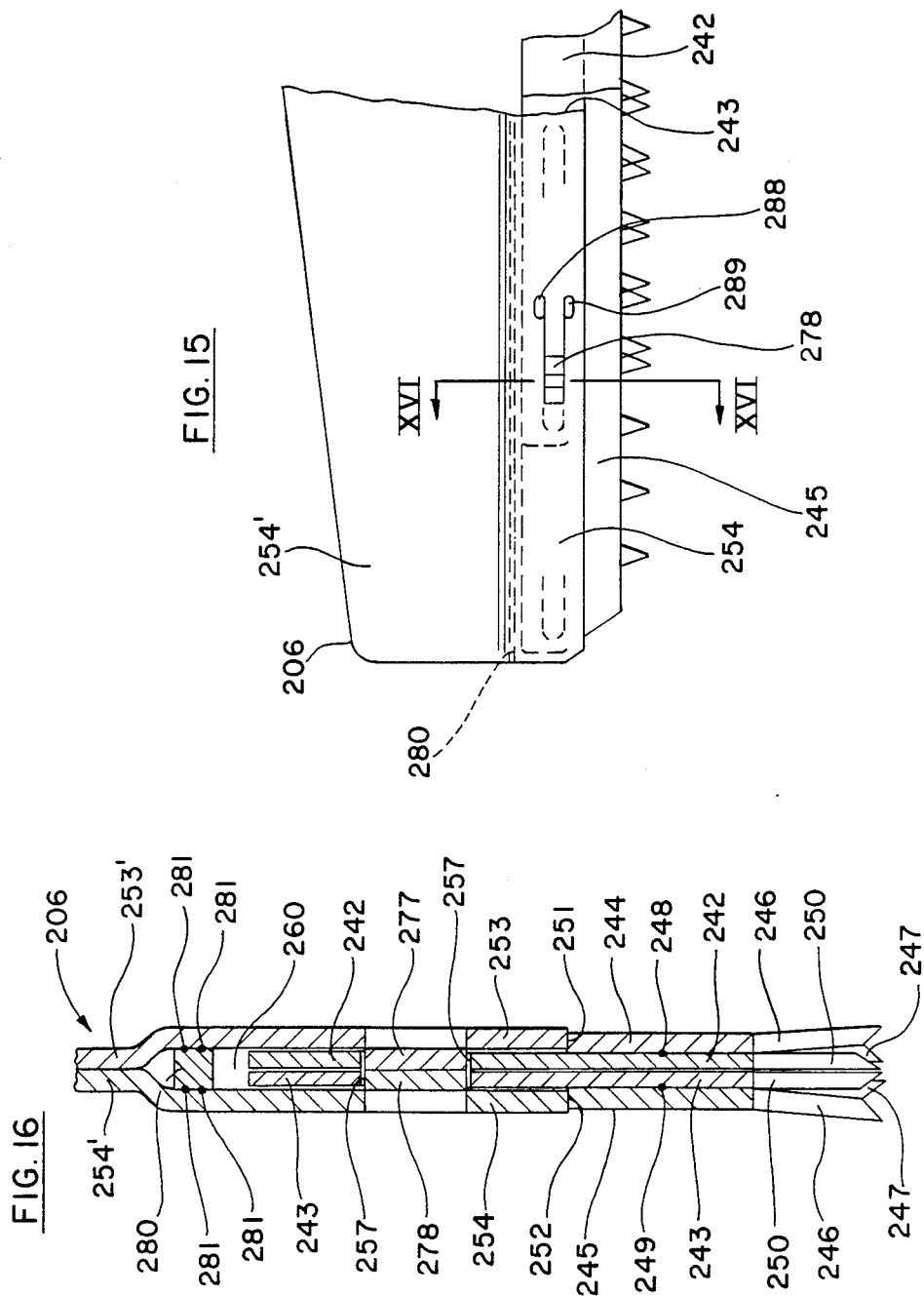

POWER DRIVEN SAW WITH RECIPROCATING SAW BLADES

FIELD OF THE INVENTION

The invention relates to power driven saws, particularly electrically powered saws, with two saw blades arranged adjacent and parallel to one another and reciprocating in opposite directions.

BACKGROUND OF THE INVENTION

A saw of this type is disclosed in U.S. Pat. No. 2,840,125 in which a support for the saw blades essentially comprises strip sheet metal bent in U-shaped manner and in which the saw blades are inserted and are secured by means of a screw extending through longitudinal slots therein. The saw blades are built up in one piece from relatively thick material, and the longitudinal shoulders of the saw blades have substantial width approaching the maximum material thickness of the blades.

SUMMARY OF THE INVENTION

We have realized that the above saw has a disadvantage. On cutting a workpiece, material, such as sawdust and chippings, can penetrate into the area between the two reciprocating saw blades. This leads to a tendency for the saw blades to separate, which is automatically increased by further material being pushed between them, so that finally the saw may be damaged or at least operation must be interrupted.

This difficulty can be reduced by making the saw blades relatively solid and thick, and so more resistive to deformability; also guiding the saw blades within very narrow tolerances may help, so that in operation the saw blades slide with their facing surfaces in fairly closely engaging manner. However, such constructions are rather complicated, heavy and increase the width of the cut being sawn.

The object of this invention is to mitigate the above disadvantages and provide a saw in which the saw blades do not tend to separate during normal use.

A feature by which this object is achieved is by arranging for the reactive forces acting on the saw blades during cutting a workpiece to generate resultant forces or torques which press the saw blades together in the area of their teeth.

This has the advantage that very thin-walled saw blades may be used if desired so enabling thinner cuts to be made and making the saw lighter.

Accordingly, therefore, there is provided by the present invention a power driven saw comprising two saw blades arranged adjacent and parallel to each other, means for oppositely reciprocating the saw blades in a longitudinal direction, and means for generating forces in operation pressing the saw blades together in the area of their teeth. The saw blades have outer surfaces formed with longitudinal shoulders, these shoulders extending in said longitudinal direction and facing upwardly away from the bottom edges of the saw blades. A support plate has spaced apart lower supporting sections defining a receiving slot therebetween, the saw blades being received in this receiving slot with lower edges of the supporting sections supportingly engaging the shoulders of the saw blades with a free space in the slot remaining above the upper edges of the saw blades. The force generating means comprises the saw teeth, the lower edges of the supporting sections and the shoulders of the saw blades, forces generated on the saw blade shoulders by the lower edges of the supporting sections together with forces acting on the saw teeth upon engagement in operation with a workpiece being arranged to generate resultant forces pressing the saw blades together in the area of the saw teeth.

Due to the supporting of the saw blades only taking place by means of their longitudinal shoulders and not via their upper longitudinal edges, the supporting forces can be arranged to act relatively far outwards on the saw blades, and consequently produce forces or torques which press together the saw blades in their areas carrying the saw teeth. Moreover, through the construction of the saw teeth, such as the setting, grinding, etc. thereof, the forces acting outwardly on the outer areas of the saw blade, upon engagement with the workpiece, can be made smaller than the forces acting inwardly on the inner areas of the saw blade. In this way, in addition to the inward torques produced via the blades' shoulders, a resultant inward force can be produced by the teeth of each saw blade.

As a result of these forces which, in operation, bring about a pressing together of the saw blades in the vicinity of the saw teeth, not only a spreading or separation of the saw blades is avoided, but also the mounting of the saw blades does not have to take place with such close tolerances. Even if there is a relatively large lateral or transverse clearance between the saw blades, the saw blades as a whole do not have to be pressed together in operation. Further, relatively resiliently deformable saw blades can be employed.

In order to obtain an adequately stable construction when using thin-walled and therefore easily deformable saw blades, the bending resistance moment of the support plate may be 7.5 to 30 times, and preferably 10 to 25 times, the bending resistance moment of a saw blade.

The bending resistance moment is a measure of the extent to which the support plate and saw blade can bend elastically sideways if, when held at one end, they are subject to the same laterally directed force at the other and free end. Thus, in the case of the present invention, it is possible to use saw blades which, on loading with a given laterally directed force, can be 7.5 to 30 times, and preferably 10 to 25 times, more elastically deflected than the support plate.

The result of such a construction is that very thin-walled and therefore considerably laterally elastically deformable saw blades, which for example have a maximum thickness of 1 to 2 mm, may be used. Through the structure of the support plate, which enclosed the saw blades in the upper area above the longitudinal shoulders and so prevents lateral displacement, it is ensured that in operation, and despite their thin-walled nature and deformability, there can be no effective lateral displacement of the saw blades. Instead, due to the stability of the support plate, the saw blades are held in the desired aligned position. The support plate also prevents a bending of the saw blades under any heavy loads occurring in operation.

In order to achieve the aforementioned pressing together of the saw blades in the vicinity of the saw teeth, each of the saw blades may, for example, have at least three groups of saw teeth. A first group comprises saw teeth located at the outside of the saw blade and which are outwardly set to project beyond the outer planar surface of the saw blade. The second group comprises non-set saw teeth located on the inside of the saw blade and which are ground from their lower edges outwardly with respect to the saw blade. The third group comprises saw teeth whose roots are located further to the outside of the saw blade than the saw teeth of the second group, and which are set inwards but so as not to project beyond the saw teeth of the second group.

Thus, on engaging with the workpiece, although forces act on the first group of saw teeth in the direction of bringing about a separation of the two saw blades, the forces acting on the second group of saw teeth due to the grinding of the latter, and the forces acting on the third group of saw teeth as a result of the setting thereof, lead to forces which bring about a pressing together of the two saw blades.

Preferably, the roots of the saw teeth of the first and third groups are located in an area of the saw blade located further outwards than the longitudinal plane through the saw blade at the inner edge of the longitudinal shoulder.

The thickness of the longitudinal shoulder preferably does not exceed half the maximum thickness of the saw blade, because then the supporting force acts relatively far outwards on the saw blade and consequently assists the production of the desired strong torque. Similarly, the thickness of the longitudinal shoulder preferably does not exceed the thickness on the lower edge of the respective supporting section of the support plate.

The support plate is preferably plate-like, the latter term being understood to mean that the extension in one plane over most of the dimensions is at least 10 times greater than the dimension at right angles to said plane.

In the vicinity of its fixing end, the plate-like support plate preferably has a greater height than in the vicinity of its free end, so that the shape of the support plate is adapted to the vertical bending loads which actually occur in operation.

Preferably, the support plate has in the area surrounding the saw blades a greater thickness than in an area above the saw blades. Such a structure is advantageous because it prevents jamming of the support plate if the cut being made in a workpiece starts to close.

In order to achieve a very simple and inexpensively manufacturable construction of the saw blades, the longitudinal shoulders of each saw blade can be formed by an outer section carrying saw teeth which section is connected, preferably welded, flat with a main inner section carrying saw teeth and extending upwardly above the outer section.

Such a saw blade can consequently comprise two parts which can be very easily manufactured from strip material, namely the outer section and the inner main section.

During operation, cut material may pass into the free space between the saw blades and the support plate. In order to facilitate removal of this material, it is possible to provide in the support plate bores connecting the free space above the saw blades to the outer surface of the support plate to enable the material to pass out of the free space.

The saw may have an outer plastic housing in which is located a metallic gear housing containing cutting blade holders. So that the support plate can be firmly held in position, even under the loads occurring in operation, and avoid any undesired displacement of the saw blades, the support plate may be fixed to the gear housing. For this purpose a mounting projection, with abutment surface for the mounting area of the support plate, can be formed on the gear housing. In this way, not only does the support plate very effectively dissipate the heat from the saw blades, but also from the gear housing.

Other objects, features and advantages of the present invention will become more fully apparent from the following detailed description of the preferred embodiment, the appended claims and the accompanying drawings.

BRIEF DESCRIPTION OF THE DRAWINGS

In accompanying drawings, in which the same reference characters in different Figures indicate like parts:

FIG. 1 is a side view of a powered tool according to the invention in the form of an electrically driven, portable saw;

FIG. 2 is a plan view of the saw of FIG. 1;

FIG. 3 is a rear end view of the saw of FIG. 1 from the right in FIG. 1, the support handles being removed:

FIG. 4 is a front end view of the saw of FIG. 1 from the left in FIG. 1;

FIG. 15 is a partial side view similar to FIG. 9 of a modified support plate with inserted blades according to the invention; and FIG. 16 is a section along the line XVI—XVI of FIG. 15.

DESCRIPTION OF THE PREFERRED EMBODIMENTS

Figure 5:
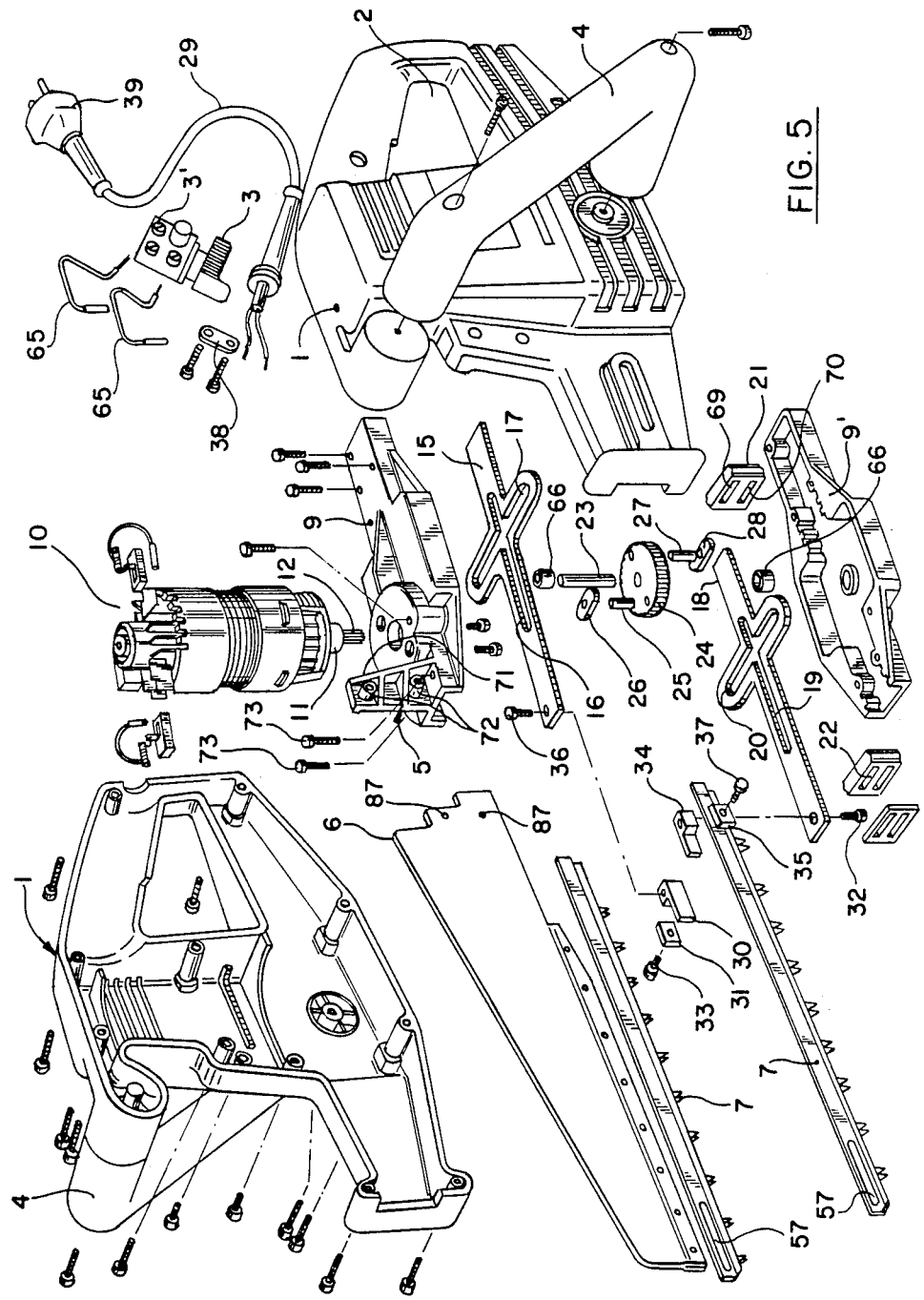
FIG. 5 is an exploded view of the saw of FIGS. 1 to 4 with some parts omitted and others simplified for clarity.

The saw shown in FIGS. 1 to 4 has a housing 1 built up in the conventional manner from half-shells and which houses an electric motor 10 (but optionally an internal combustion motor could be employed), a gear arrangement and cutting blade holders 15 and 18. On the rear part of housing is provided a handle opening 2 into which extends in the conventional way a manually operated trigger element 3 of an on-off switch 3' (see FIG. 5). On the front part of housing 1 is provided a diagrammatically indicated mounting arrangement 5 for fitting a support plate 6. This support plate 6 supportingly engages around the upper areas of a pair of oppositely reciprocating saw blades 7. Lateral support handles 4 extend from housing I between the rear handle opening 2 and the support plate 6. The two lateral handles 4 are individually detachable to temporarily reduce the overall width dimension of the whole saw on either or both sides to enable closer cuts to be made, e.g. when sawing a branch from a tree. This can be accomplished by simply removing two screws retaining either handle 4, as can be appreciated from the right-hand side of FIG. 5. When both handles 4 are so removed, a spacing handle portion 4' (see FIG. 2), to which the upper leg of each handle 4 is attachable, serves as a temporary forward handle.

As can be gathered from FIG. 5, an electric lead 29 with plug 39 is fixed to the rear handle part of housing 1 by a tension relief plate 38. Two short cable sections 65 with terminals are used for producing an electrical connection from the on-off switch 3' to the electric motor 10. The motor 10, housed in housing 1 and on whose armature shaft 11 is located a fan wheel 13 (see FIG. 6), is mounted in tower construction manner upright on an upper, metallic partial housing 9 of the gear arrangement. The lower and outer end of the armature shaft is formed as a pinion 12 and extends downwardly through partial housing 9 and projects through longitudinal slots 16 and 19 of the cutting blade holder 15, 18. The lower end of the armature shaft 11 is mounted in a bearing 14 (see FIG. 6) in a lower, metallic partial housing 9'.

As can in particular be gathered from FIG. 5, the cutting blade holders 15, 18 have a cross-like configuration and, in addition to the longitudinal slots 16, 19, have guidance slots 17, 20 at right angles thereto. It can be seen that the longitudinal slots 16, 19 are not separated by a web from the guidance slots 17, 20. Thus, when the cutting blade holders 15, 18 are longitudinally displaced, the armature shaft 11 passes out of an area of the longitudinal slots 16, 19, through the area of guidance slots 17, 20, and then into the opposite, other area of longitudinal slots 16, 19.

Parallel to the armature shaft 11, in an area closer to handle opening 2, a bearing spindle 23 extends through the partial housing 9. The spindle 23 is rotatably mounted at both ends in bearing bushes 66 in partial housing 9, 9', and has non-rotatably secured thereon a gear 24, the latter meshing with pinion 12.

The gear 24 is located between the two cutting blade holders 15, 18 and its bearing spindle 23 extends in the same way as armature shaft 11 through longitudinal slots 16, 19. The length of these slots 16, 19 is selected in such a way that, in a manner to be described hereinafter, the cutting blade holders 15, 18 reciprocate over their entire travel, in the drawing planes of FIGS. 6 and 7, in the direction of the longitudinal extension or axis of each holder. On radially opposite sides of the gear 24 are fitted eccentric pins 25, 27, on whose outer ends are rotatably mounted sliding pieces 26, 28. In the normal use position of the saw shown in FIGS. 1 and 6, sliding piece 26 is positioned above the gear 24 and sliding piece 28 below gear 24. Sliding piece 26 engages in the transverse guide slot 17 of the upper cutting blade holder 15, and sliding piece 28 in the guide slot 20 of the lower cutting blade holder 18. Therefore, the distance between the two cutting blade holders 15, 18 is only about the thickness of the gear 24.

The length of each sliding piece 26, 28 corresponds to at least twice the width of the longitudinal slot 16, 19 plus the diameter of the associated eccentric pin. This ensures that each sliding piece 26, 28 is reliably guided in any position in the associated guidance slot 17, 20 and does not tilt towards the longitudinal extend of the respective longitudinal slot 16, 19 in the transition region where the slots intersect.

The eccentric pins 25, 27 are located on a diagonal through the central axis of gear 24 and have the same radial spacing from the bearing spindle 23.

The cutting blade holders 15, 18 are supported by two bearing blocks 21, 22 each having two parallel slots 69, 79 separated by a web. The height and width of slots 69, 70 is chosen in such a way that each elongated, cross-sectionally substantially rectangular cutting blade holder 15, 18 passes through the same with a slight clearance, so that there is a good longitudinal guidance for the holders 15, 18. The bearing blocks 21, 22 are inserted respectively on the rear and front ends of the partial housing 9, 9', and are secured by dovetail guides or similar guidance grooves which prevent tilting of said bearing blocks 21, 22 during reciprocation of the blades 7.

Figure 6:
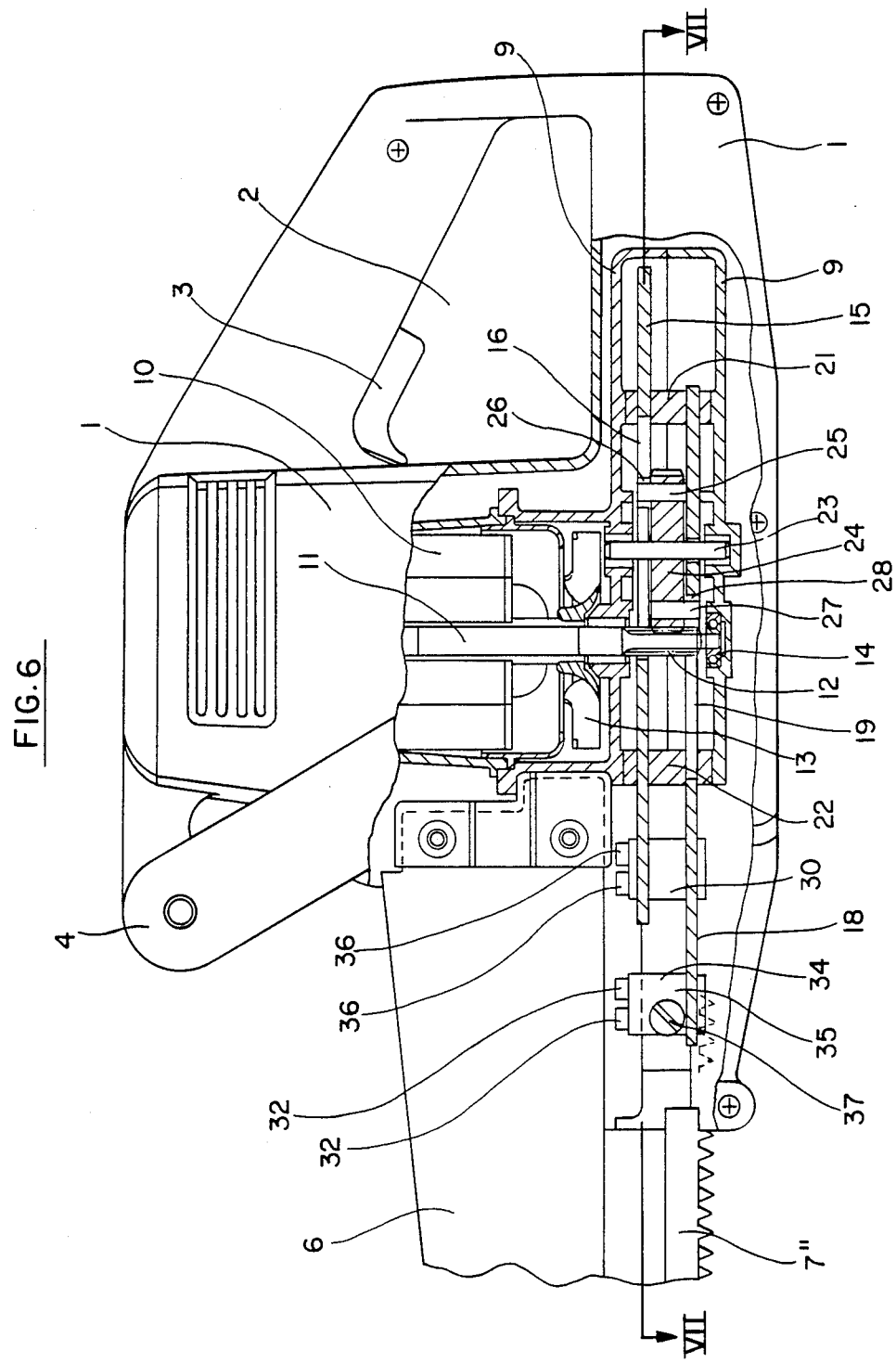
FIG. 6 is a partial side view on a larger scale of the saw of FIG. 1, partly broken away and partly in section to show the motor, gearing and cutting blade holders.
Figure 7:
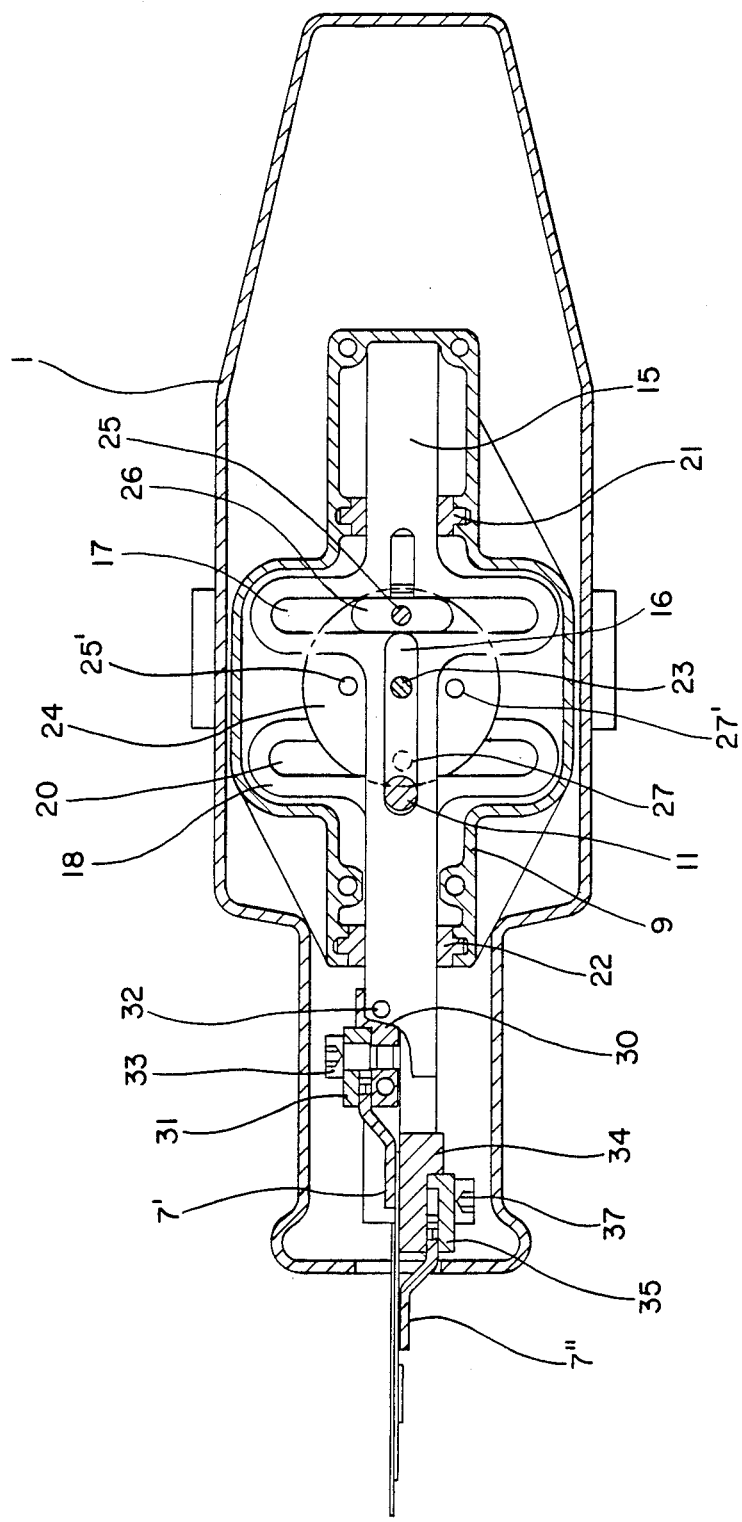
FIG. 7 is a section along the one VII—VII of FIG. 6.

On the ends of the cutting blade holders 15, 18 projecting forwardly out of the partial housing 9, 9', and located to the left in FIGS. 6 and 7, are mounted cutting blade fixtures in the form of clamps. These clamps comprise clamping blocks 30, 34 fixed by means of screws 32, 36 to the cutting blade holders, and clamping pieces 31, 35 pressible towards opposite sides of the holders 15, 18 by a single clamping bolt 33 or 37. As shown in FIG. 7, between the clamping block 30 and clamping piece 31 is secured an offset end of the right-hand saw blade 7'. Correspondingly, the rear end of the offset portion of the left-hand saw blade 7'' is secured between clamping block 34 and clamping piece 35. The saw blade shafts are secured to these outwardly offset ends, for example by welding, and the cutting blade portions of the saw blades are thus located immediately adjacent to one another. FIG. 6 shows a preferred arrangement of the screws 32 and 36, this being modified from the arrangement in FIG. 5.

When the armature shaft 11 is driven by motor 10, it rotates gear 24 via the pinion 12, so that eccentric pins 25, 27 perform a rotary movement about the central axis of bearing spindle 23. As a result of this rotary movement, there is a corresponding displacement of sliding pieces 26, 28 which oscillate backwards and forwards in guidance slots 17, 20. Due to the rotary movement of the gear 24, the sliding pieces 26, 28 reciprocate the associated cutting blade holders 15, 18 in the direction of the longitudinal extension or axis of the holder. If, in this connection, it is assumed that the movement starts from the position according to FIG. 7, then on rotation of the gear 24 the cutting blade holder 15 is displaced to the left from its outer right-hand position in FIG. 7, and the cutting blade holder 18 is displaced to the right from its outer left-hand position in FIG. 7, i.e. cutting blade holders 15 and 18 are oppositely reciprocated. The travel or stroke of the two cutting blade holders is the same, because the spacing of the associated eccentric pins 25, 27 from the bearing spindle 23 of gear 24 is the same.

During the oscillation of sliding pieces 26, 28 in guidance slots 17, 20, the sliding pieces cross over the longitudinal slots 16, 19 without this impairing the movement of the sliding pieces. This is because, as a result of their dimensions, the sliding pieces are always reliably guided in guidance slots 17, 20 and cannot tilt in the crossing region with the longitudinal slots 16, 19.

As indicated in FIG. 7, additional pairs of bores 25', 27' can be provided in the gear 24. These bores 25', 27' are located closer to the bearing spindle 23 than the eccentric pins 25, 27, but have in each case the same spacing from bearing spindle 23. Thus, if eccentric pins 25, 27 are inserted in bores 25', 27', with an otherwise substantially identical construction of the saw, there will be a smaller travel or stroke of the cutting blade holders 15 and 18. This enables the saw to be converted to a shorter reciprocating stroke of the cutting blades 7 if desired.

The plate-like support plate 6, whose construction will be described hereinafter, is fixed to an upward projection 5 (see FIG. 5) by means of holes 87 provided on its rear mounting end. Projection 5 is formed on the front end of partial housing part 9 and has a rear reinforcing rib 71. Formed-on or mounted screw bushes 72, for receiving clamping bolts 73, extend through a vertical wall of the projection 5, and these bolts extend through the mounting holes 87 of support plate 6.

The construction of the support plate 6 and the saw blades 7, as well as their interaction, can best be seen from FIGS. 8 to 12.

As shown, support plate 6, which at its end having the mounting holes 87 is higher than at the opposite end (see FIG. 8), comprises two individual, shaped plates 53', 54' (FIG. 10), which are interconnected by spot welding. This leads to a high stability against twisting and bending. Plates 53', 54' can be made from steel or aluminum and so cause good heat dissipation from the cutting blades. In the lower region, plates 53', 54' are outwardly stepped so as to form parallel support sections 53, 54 with an intermediate cavity formed therebetween. This cavity accommodates the upper regions of the two saw blades 7', 7".

Figure 10:
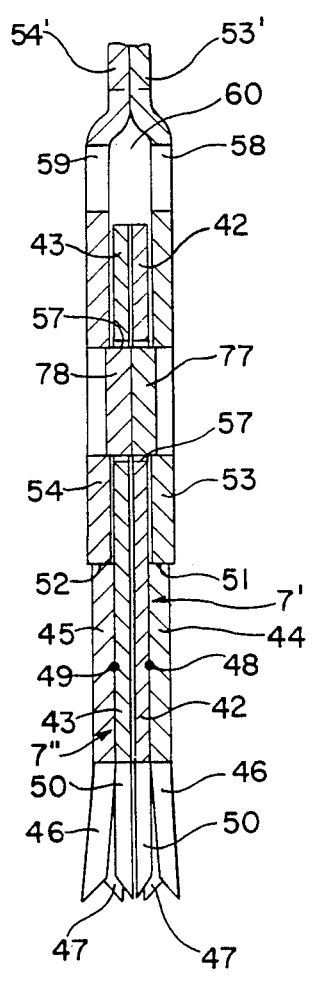
FIG. 10 is a section along a lower part of the line X—X of FIG. 9.
Figure 11:
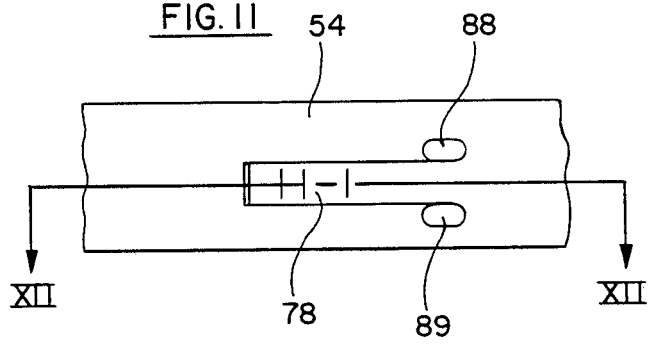
FIG. 11 is a fragmentary view, on a larger scale of a detail in circle XI in FIG. 9.

As can in particular be gathered from FIG. 10, the saw blades in each case comprise a main inner section 42, 43 and a separate reduced height outer section 44, 45 which, as indicated at 48 or 49, are connected by spot welding. The upper edge of reduced height section 44 or 45 of the unit constituted by section 44 or 45 and main section 42 or 43 forms a longitudinal shoulder 51 or 52. In operation, the shoulders 51, 52 are supported on, and slide along, the lower edges of the support sections 53, 54 (see FIG. 10), respectively. Whereas, as can also be gathered from FIG. 10, the upper edges of the main sections 42, 43 terminate below the stepped portions at the upper end of support sections 53, 54, so that a free space 60 is formed above the main sections 42, 43. This ensures that the main sections 42, 43 are not supported or contacted on their upper edges.

On the lower edges of sections 44, 45 are formed saw teeth 46, 47. The saw teeth 46 are set outwardly, so that they project beyond the outer face of the associated blade section 44, 45, and consequently produce a cut in the workpiece which is wider than the maximum material thickness of the two saw blades. The saw teeth 47 on sections 44 and 45 are set inwardly, so that they extend into the area below the associated main section 42, 43. On the main sections 42, 43 are located non-set saw teeth 50 ground in upwardly and outwardly sloping manner from their lower edges.

Figure 9:
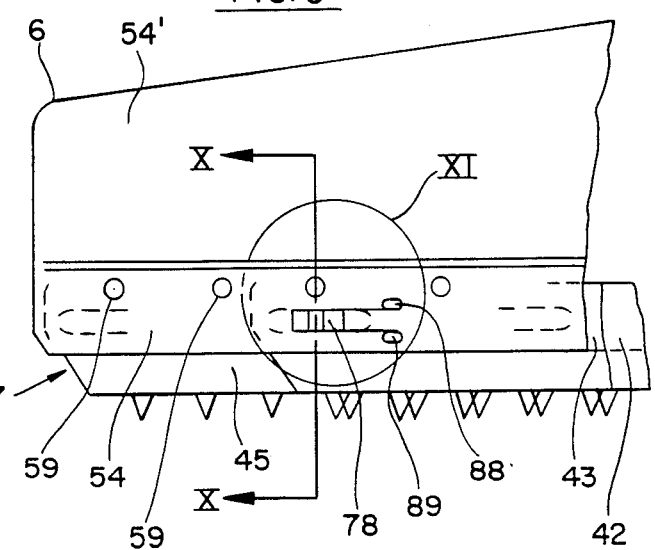
FIG. 9 is a partial view of the front portion of the support plate of FIG. 8 with inserted saw blades.

Adjacent their forward ends, the saw blades have longitudinal slots 57 (FIG. 5) running parallel to the longitudinal shoulders 51, 52 and the end regions of these slots 57 are indicated in broken line form in FIG. 9. Leaf spring strips 77, 78 (FIGS. 9 to 12), constructed in a manner to be described hereinafter on support plate 6, extend into these longitudinal slots. The saw blades 7 are guided at the front area of the support sections 53, 54 in longitudinally reciprocatable manner by and between the leaf spring strips 77, 78. These leaf spring strips 77, 78 also prevent the release of the saw blades from the support plates 6. The rear ends of the saw blades are fixed to the cutting blade holders 15, 18 in the manner described hereinbefore.

In operation, when the saw teeth 46, 47, 50 of the saw blades engage with a workpiece, so forcing the saw blades towards the support plate 6, displacement of the saw blades into the support plate 6 is prevented by the longitudinal shoulders 51, 52 of the saw blades. The support sections 53, 54 exert a downward supporting force on these longitudinal shoulders. These forces exerted downwards on the longitudinal shoulders 51, 52, particularly if as shown, each outside section 44, 45 and each inner main section 42, 43 have the same thickness or sections 44, 45 are less thick than the main sections 42, 43, lead to a torque which presses together the saw blades in their lower region carrying the saw teeth, so that the non-set saw teeth 50 are pressed against one another. Moreover, an upwardly and outwardly directed force acts on the outwardly set saw teeth 46 due to the engagement with the workpiece, particularly as the saw teeth 46 are also ground in outwardly inclined manner from top to bottom. This latter force acts in the manner of forcing apart the saw blades in the vicinity of saw teeth 50. However, saw teeth 47 are set inwards and have ground edge sloping from top to bottom and also inwards, so that an upwardly and inwardly acting force occurs thereon which counteracts the separating force for the saw blades through saw teeth 46. A corresponding force also acts on saw teeth 50 which, as a result of the grinding thereof inclined outwardly and upwardly from the inside, act upwardly and inwardly.

The shape and positioning of the saw teeth 46, 47, 50 are matched so that a torque is produced on the two saw blades in the vicinity of saw teeth 50 through the forces acting on saw teeth 46, 47, 50 and by the supporting forces acting on longitudinal shoulders 51, 52. The torque pressed together the saw blades in this area, so that saw teeth 50 and the area of the main sections 42, 43 adjacent to the teeth 50 are firmly pressed together in operation, even without maintaining close tolerances. Consequently, the risk of the saw blades being separated by material penetrating between them is effectively eliminated.

Figure 12:
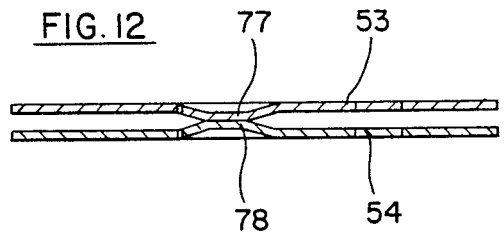
FIG. 12 is a partial section along the line XII—XII of FIG. 11, the saw blades being omitted.

As has already been stated, by means of the leaf spring strips 77, 78, the saw blades are held between the support sections 53, 54 of support plate 6. These leaf spring strips are cut out of the walls of support sections 53, 54 by punching or stamping, so that the strips 77, 78 are only connected by their right-hand ends in FIGS. 9, 11 and 12 with the wall of the particular support section 53, 54. Adjacent to the connection of these strips, and for reducing any notch effect, openings 88, 89 are formed in the supports sections 53, 54 above and below each strip and on the forward side of the respective connection. During the punching operation, the leaf spring strips 77, 78 are deformed in such a way that their central regions curve inwards and are concavely shaped, as can be seen in FIG. 12, so that the strips are urged against each other and there is reciprocal support thereof. They can consequently be forced apart by the insertion longitudinally of the main sections 42, 43 of the saw blades between support sections 53, 54, and the saw blades can be so positioned that their slots 57 are located in the vicinity of the leaf spring strips 77, 78, the latter then snapping into the slots 57 to secure the saw blades against vertical displacements (FIG. 10). It will be noticed that the forward and rear portions of each strip 77, 78 flare outwardly away from each other to facilitate insertion (and removal) of the blades.

As the leaf spring strips 77, 78 are produced during the stamping operation by cutting in, i.e. without any material removal, their upper and lower edges in operation are supported on the resulting boundary upper and lower edges of the slots so formed in the walls of supports sections 53, 54. Thus, in operation there can be no vertical displacement (FIG. 10) of strips 77, 78 i.e. they provide a high stability for the supporting of the forward portions of the saw blades.

For removing the saw blades, the user has to loosen them from the cutting blades holders 15, 18 and then displace the saw blades in such a way that the leaf spring strips 77, 78 are resiliently displaced outwardly and are forced out of the slots 57 in main sections 42, 43 of the saw blades. The saw blades can then be slid out from between the support sections 53, 54.

Figure 8:
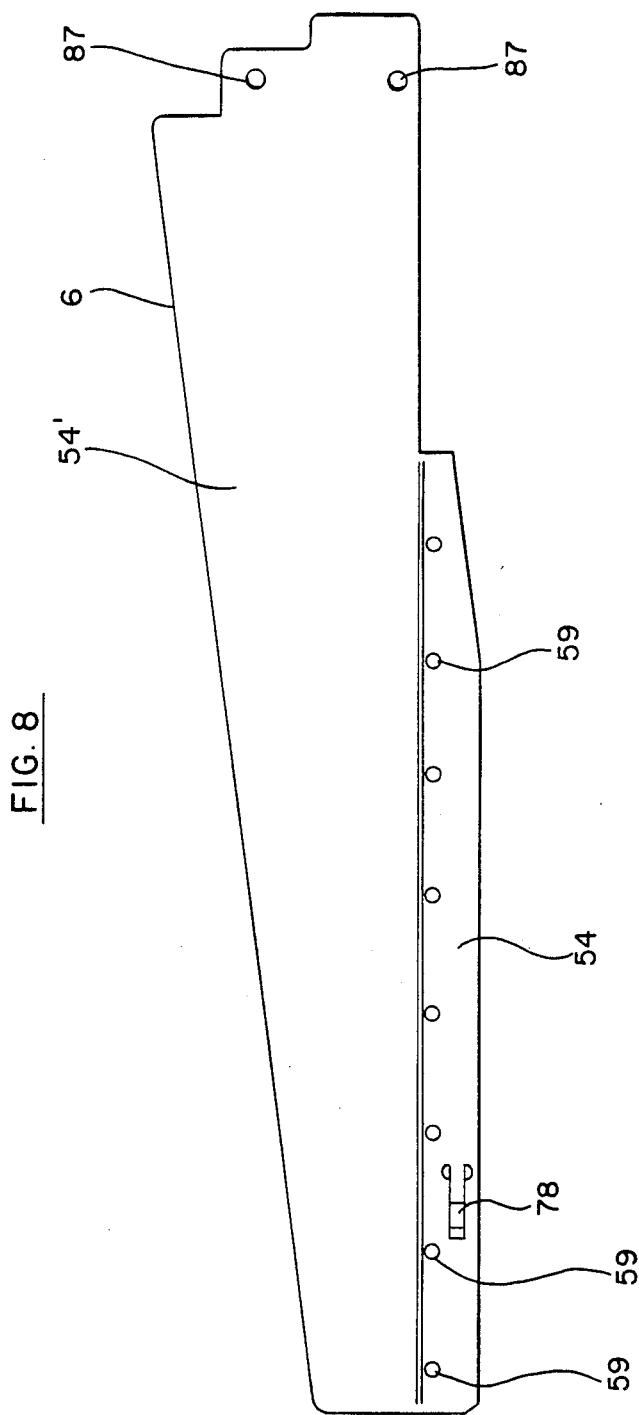
FIG. 8 is a side view of the support plate of the saw of FIGS. 1 to 7.

As can be gathered from FIGS. 8 to 10, openings 58, 59, in the form of through bores, are provided in support sections 53, 54 above the upper edges of the main sections 42, 43 of the saw blades. The openings 58, 59 effect communication of the free space 60 (FIG. 10) with the outside of the support sections 53, 54. These openings permit the discharge of cut material, which in operation may enter between the support sections 53, 54 and the blades, and could lead to operational problems if allowed to collect in the space 60.

Figure 13:
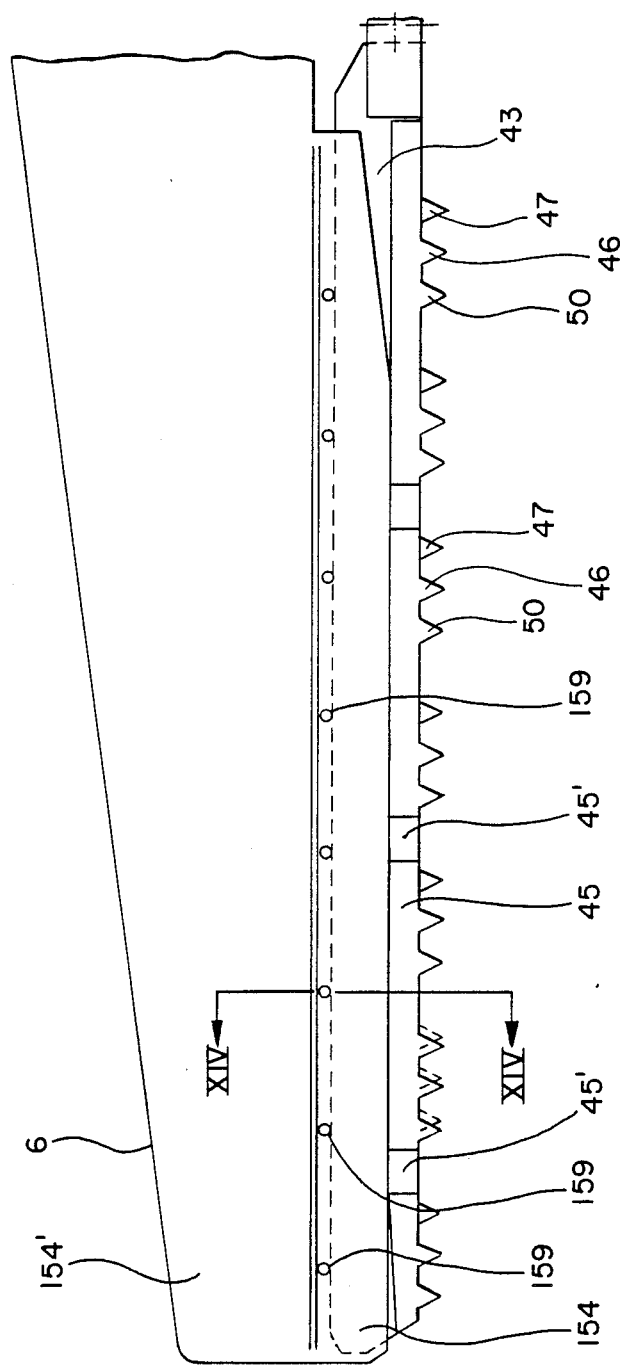
FIG. 13 is a partial side view of another support plate with inserted saw blades according to the invention.
Figure 14:
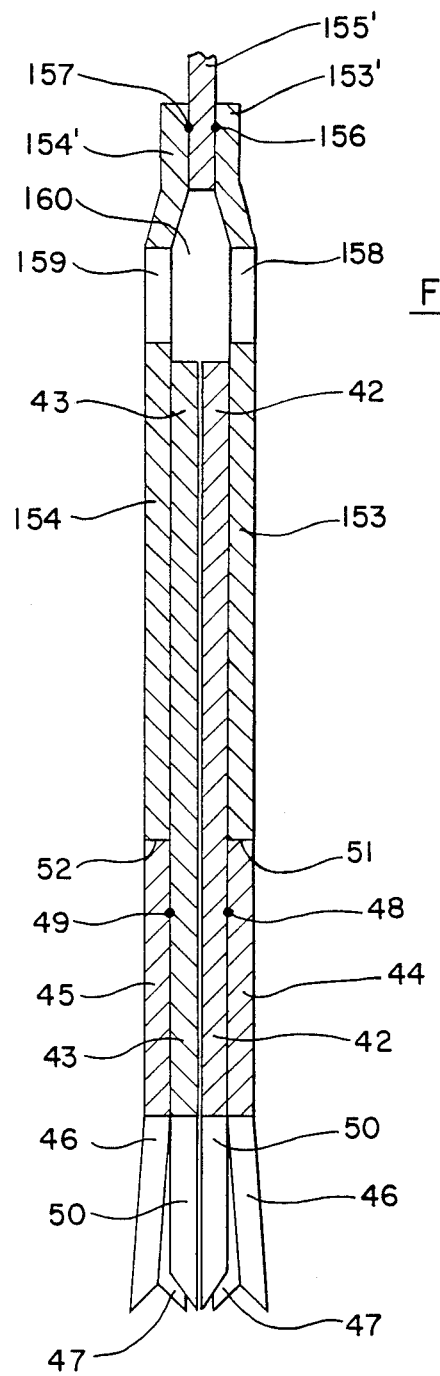
FIG. 14 is a lower part of the section along the line XIV—XIV of FIG. 13.

FIGS. 13 and 14 show a support plate which is somewhat modified compared with that of FIGS. 8 to 12, and in which modified saw blades are inserted. The same parts as those in FIGS. 8 to 12 are given the same references in FIGS. 13 and 14 and corresponding parts generally have their reference numerals increased by 100.

It should be noted that FIG. 13 does not show the leaf spring strip for securing the adjacent saw blade. It is pointed out in this connection that it is possible to choose a different type of retaining mounting of the saw blades in the front region of the support plate. For example, it would be possible to provide a rivet extending through the support sections 153, 154 and the reception space located between them; in their main section 42, 43 the saw blades could then each have a forwardly open slot to permit the insertion of the saw blades over the rivets.

The support plate according to FIGS. 13 and 14 comprises three partial plates 153', 155' and 154' which, as indicated at 156 and 157, are joined by spot welding. The central plate 155' does not extend down to the bottom edge of the support plate, but ends where the two outer plates 153' and 154' are outwardly displaced, or stepped apart, so as to form the spaced-apart support sections 153, 154. The saw blades, that is their main sections 42, 43, are inserted in the cavity so formed between the support sections 153, 154.

The free space 160 above main sections 42, 43 is once again connected by cross-bores 158,159 to the outside of support sections 153, 154, so that cut material can be removed out of the free space 160 through these bores 158, 159. The cross-bores 158, 159 (and also the cross-bores 58,59) are preferably aligned in pairs 158, 159.

To aid removal of cut material from the saw teeth, it is possible to provide in sections 44, 45 grooves or channels 45' (FIG. 13) extending from the saw teeth to the longitudinal shoulders 51, 52, this enabling the cut material to be removed upwards on the outside of the blades. These grooves can, for example, be created by forming the blade outer sections 44, 45 from a plurality of partial lengthwise sections attached to the main and inner blade sections 42, 43 in spaced apart relationship; in this way the grooves 45' are formed between these longitudinally spaced apart partial sections.

When manufacturing a support plate as shown in FIGS. 8 to 10, it can be difficult to bend outwardly and form outwardly directed steps in the two plates, forming the supporting sections 53, 54, with close tolerances so that a predetermined width of the cavity between the supporting sections 53, 54 is obtained. Such close tolerances are desirable for closely enclosing the upper parts of the saw blades between support sections 53, 54. Further, rigidity of a support plate 6 comprising two individual plates 53', 54' as shown in FIGS. 8 to 10 can be insufficient for certain uses. However, the use of individual stepped plates 53', 54' (or 153', 154' in FIG. 14) is advantageous to reduce the weight of the support plate 6, and so therefore the weight of the saw. These stepped plates can be made of relatively thin steel or aluminum plate so that the combined thickness of the two plates is substantially less than using a single thick plate and machining a blade cavity therein. Due to the steps in the two individual plates, the combined thickness of the two plates can be of the order of the combined thickness of the main and inner portions 42, 43 of the saw blades 7, see, for example, the upper portion of FIG. 10. This is because the steps at the top of the support sections 44, 45 enable an adequate blade containing cavity to be defined and also provide strengthening reinforcement of these thin plates.

To improve the rigidity of the support plate 6, a steel bar or strip 280 may be incorporated as shown in FIGS. 15 and 16 in which the same parts as in FIGS. 9 and 10 are given reference numerals increased by 200 over the reference numerals used in FIGS. 9 and 10.

As can be recognized, particularly from FIG. 16, the steel bar 280 is rectangular in cross-section and is located between the support sections 253, 254 formed by the outwardly bent and stepped lower parts of the two individual plates 253', 254' constituting the support plate 206. The steel bar 280 is located above the upper edges of the main sections 242, 243 of the saw blades so that a free space 260 is provided between such upper edges and the steel bar 280. Therefore, the saw blades are supported by the lower edges of the supporting sections 253, 254 which are in engagement with the longitudinal shoulders 251, 252 of the outer sections 244, 245 of the saw blades.

The steel bar 280 is located just beneath the bent transitional area of the plates 253' and 254', that is just below the outward steps, and is connected to the support sections 253, 254 by spot welding as indicated at 281. Thereby, the width of the cavity (which is also the width of the free space 60 at the top of the cavity) between the support sections 253 and 254 is exactly defined by the width of the steel bar 280; any inaccuracies occurring during the bending action (to form the steps) are automatically compensated or removed. Further, the lowermost connection area of support sections 253, 254 has been moved nearer to the saw blades compared to the structure of FIGS. 8 to 10. Since, the saw blades transmit forces against the support sections 253, 254, the rigidity of support plate 206 is considerably increased by locating this lowermost connection area nearer to the saw blades.

It should be noted that in the embodiment of FIGS. 15 and 16 through-bores for removal of cut material from the open space 260, i.e. through-bores corresponding to the bores 58, 59 in FIGS. 8 to 10, are omitted. However, such through-bores can, of course, be also provided in the embodiment of FIGS. 15 and 16 below the bar 280.

It will be appreciated from the foregoing that a versatile saw, particularly useful for cutting and logging trees, is provided which has an improved cutting action and also has a lighter-weight yet robust saw blade and support plate assembly. As will be realized, both the construction of the saw blade and the support plate, contribute to this improvement.

The saw blades are each formed from two separate and toothed blade sections, preferably spot wielded together. Each blade is thin, and is of low height relative to its length and to the height of the support plate. This, together with the formation of the support plate including two individual stepped plates, again preferably spot welded together, enables a reduction in weight of the assembly of the support plate and saw blades while still providing sufficient rigidity for this assembly. The saw blades in this assembly may each be as thin as 1 mm to 2 mm, and the moment of resistance against bending of the composite support plate may be in the range of 7.5 to 30 times that of each saw blade. Preferably, the resistance to sideways bending of the support plate is 10 to 25 times that of each saw blade.

Each saw blade has teeth comprising three different types, inside, intermediate and outside teeth. These different teeth, respectively 50, 47 and 46, are so shaped that the resultant force on these teeth from the wood when cutting is directed inwards towards the other saw blade, so contributing to the two blades not separating laterally at the teeth when cutting. This is important, since lateral separation of the cutting edges of the two blades in operation would allow wood cuttings, e.g. sawdust, to penetrate between the blades so gradually forcing the bottom cutting edges of the blades apart; this would result in a wider and less clean cut being made and also would tend to damage the blades—eventually with jamming of the blades in the support plate. In the teeth arrangements shown, the outside tooth 46 determines the width of the cut but has a force exerted on it tending to separate the saw blades; however, the intermediate tooth 47 and the inside tooth 50 are both oppositely inclined in grinding to the outside tooth 46 and so have two forces exerted on them which are both in a direction tending to force the saw blades together. Thus, the resultant force on the three teeth 50, 47, 46 is in an inward direction forcing the cutting edges of the two blades together. As shown in FIG. 13, preferably the different teeth are grouped together along the length of each saw blade with a tooth 46 in the middle of each group and a tooth 50 and a tooth 47 on each side thereof.

An important feature of forcing the two saw blades together has been found to be the arrangement of the relative width and positioning of the shoulder 51, 52 on each blade to enable this to produce a strong torque on each blade tending to force together the cutting edges of the blades. In this respect it is important to have a free space, such as space 60, above the inner and main section 42, 43 of the blades; this prevents any downward force or pressure on the upper edges of the blades. Also, the outwardly positioned shoulders 51, 52 have a lateral width approximately equal to or less than half the maximum thickness, or lateral width, of the saw blade, and the lower edges of the individual plates 53, 54 of the support plate 6 contact these shoulders 51, 52 over the entire lateral width of the shoulders. This provides in operation a resultant reaction force of each individual plate 53, 54 on the associated shoulder 51, 52, which force is downward and parallel to the heightwise direction of the blade, but is offset outwardly of the central plane of the blade by at least half the lateral thickness of the shoulder 51, 52. As the shoulder has a width not larger than half the maximum thickness of the saw blade, this resultant downward force is located at least halfway between the central plane of the blade and the outside plane of the blade; thus, this resultant force produces a torque on the blade tending to rotate the cutting edge of the blade inwardly towards the other blade. Due to the above location of the resultant force being substantially displaced from the center plane of the blade, a strong torque is exhibited on both blades firmly pressing their teeth together during cutting operations.

The above described embodiments, of course, are not to be construed as limiting the breadth of the present invention. Modifications, and other alternative constructions, will be apparent which are within the spirit and scope of the invention as defined in the appended claims.

What is claimed is:

1. A power saw, comprising:
   a housing;
   a motor supported by said housing;
   two parallel elongate saw blades disposed side by side and extending in a longitudinal direction;
   reciprocating means, driven by said motor, for simultaneously reciprocating said saw blades in opposite directions;
   each saw blade having a top longitudinal edge, inner and outer side surfaces and a bottom longitudinal edge with teeth therealong;
   means for generating forces pressing said saw blades together at their teeth upon engagement of the saw blades in operation with a workpiece;
   each saw blade having a shoulder extending longitudinally along said outer side surface, said shoulder facing upwards away from said bottom longitudinal edge and de-limiting an upper blade portion of reduced thickness;
   a support plate connected to said housing and extending in said longitudinal direction, said support plate having two lower, spaced apart supporting sections defining a slot-like cavity therebetween, said supporting sections having lower edges;
   said upper blade portion of each saw blade being received in said cavity with the inner side surfaces of the saw blades facing each other and each said shoulder engaging under a respective one of said lower edges of said supporting sections, a free space remaining in said cavity above said top edge of each saw blade; and
   said generating means comprising the saw blade shoulders, the lower edges of said supporting sections, said free space, said teeth, and the relative thicknesses in the transverse direction of said saw blades, said shoulders and said lower edges, the transverse thickness of each said shoulder being no greater than half of the transverse thickness of the respective saw blade below its shoulder and also no greater than the transverse thickness of the lower edge of the respective supporting section, whereby in operation reaction forces of said lower edges against said shoulders generate inwardly directed torques on portions of the blades below said shoulders to force the blades together at their teeth.

2. The power saw of claim 1, wherein said teeth of each saw blade comprise three types of teeth, a first type at the outer side surface of the respective saw blade and ground upwardly and inwardly on an inner side, a second type at the inner side surface of the respective saw blade and ground upwardly and outwardly on an outer side, and a third type transversely between said first and second types, said third type being ground upwardly and outwardly on an outer side, said first type in operation generating an outward force tending to separate the saw blades and the second and third types in operation generating inward forces tending to press the saw blades together with a resultant force from the three types of teeth of each blade being in an inward direction to press the saw blade together at their teeth.

3. The power saw of claim 2, wherein said first type of teeth are set outwardly and project beyond the outer side surface of the respective saw blade.

4. The power saw of claim 2, wherein said second type of teeth have inner surfaces co-extensive with said inner side surface of the respective saw blade.

5. The power saw of claim 4, wherein said three types of teeth are disposed in groups along the respective said blade with a said first type located immediately between a said second type and a said third type in said longitudinal direction.

6. The power saw of claim 2, wherein each saw blade comprises outer and inner plates spot welded together, the outer plate being smaller in height than the inner plate with an upper edge of the outer plate forming said shoulder, said first type of teeth being formed on said outer plate and said second type of teeth being formed on said inner plate.

7. The power saw of claim 6, wherein said third type is formed on said outer plate.

8. A power driven saw, comprising:
two saw blades arranged adjacent and parallel to each other;
said saw blades having teeth along bottom edges;
means for oppositely reciprocating the saw blades in a longitudinal direction;
means for generating forces pressing said saw blades together in the area of said teeth upon engagement of the saw blades in operation with a workpiece;
said saw blades having outer side surfaces formed with longitudinal shoulders, said shoulders extending in said longitudinal direction and facing upwardly away from said bottom edges of said saw blades, the shoulder of each saw blade being formed by an upper edge of a plate-like outer section carrying some of said teeth, said outer section being superimposed on and attached to a main and inner plate-like section carrying some of said teeth, said main inner section extending upwardly above said shoulder;
a support plate having spaced apart lower supporting sections defining a receiving slot therebetween, said saw blades being received in said receiving slot with lower edges of said supporting sections supportingly engaging said shoulders of said saw blades with a free space in said slot remaining between said support plate and upper edges of the saw blades; and
said generating means comprising said teeth, said lower edges of said supporting sections and said shoulders of the saw blades, forces generated on said saw blade shoulders by said lower edges of said supporting sections together with forces acting on said teeth upon engagement in operation with a workpiece generating resultant forces pressing the saw blades together in the area of said teeth.

9. The saw of claim 8, wherein the width of each said shoulder is not larger than half the maximum thickness of the respective saw blade.

10. The saw of claim 9, wherein each of the saw blades comprises at least three groups of saw teeth, the first group of saw teeth comprising saw teeth located at an outer side of the respective saw blade and set outwardly to project beyond an outer plane surface of the respective saw blade, the second group of saw teeth comprising non-set saw teeth located at an inner side of the respective saw blade and being ground from their lower edges outwardly with respect to the saw blade, and the third group of saw teeth comprising saw teeth having roots located further outwardly than the saw teeth of the second group and being set inwardly with respect to the saw blade but not projecting inwardly beyond the saw teeth of the second group.

11. The saw of claim 10, wherein roots of the saw teeth of the first group and said roots of the saw teeth of said third group are located in an outer portion of the respective saw blade which is located further outwardly than a longitudinal plane through the respective saw blade at an inner edge of the longitudinal shoulder thereof.

12. The saw of claim 9, wherein said support plate comprises two individual plate portions, upper sections of which are connected together face to face, said plate portions being formed below said upper sections with outwardly directed steps, said supporting sections extending downwardly from said steps.

13. The saw of claim 12, wherein a metal bar is located between said supporting sections adjacent said steps, said free space being disposed below said bar, and said bar being rigidly connected to said supporting sections.

14. The saw of claim 13, wherein said upper sections of said plate portions are connected together by spot welding, and said bar is connected to said supporting sections by spot welding.

15. The saw of claim 9, wherein said support plate comprises three individual plate portions sandwiched together, a middle one of the three plate portions having a lower longitudinal edge spaced above lower longitudinal edges of both outer ones of the three plate portions, said outer plate portions being deformed to provide outwardly directed steps below said lower edge of the middle plate portion, and sections of said outer plate portions below said steps forming said supporting sections.

16. The saw of claim 8, wherein said outer and inner plate-like sections are welded together.

17. The saw of claim 8, wherein at the level of said free space between the support plate and said upper edges of the saw blades, bores are provided in said supporting sections connecting said free space with outer surfaces of the support plate.

18. The saw of claim 8, wherein guiding slots are provided in said saw blades above said longitudinal shoulders, said guiding slots extending parallel to said longitudinal shoulders, and resiliently pivotable spring strips are formed in cantilever manner from portions of said supporting sections, said spring strips projecting into said guiding slots.

19. The saw of claim 8, further comprising:
a housing;
a motor contained in said housing and drivingly connected to said reciprocating means;
a gear casing disposed in said housing and containing said reciprocating means; and wherein
said support plate at a rear end passes into said housing and is secured to said gear casing.

20. The saw of claim 19, wherein:
said reciprocating means comprises a gear driven by said motor and two saw blade holders reciprocated by said gear;
said gear casing has an upward projection with a mounting surface on one side; and
said support plate abuts said mounting surface and is secured to said upward projection.

21. The saw of claim 8, further comprising:
a housing; and
a motor supported by said housing and drivingly connected to said reciprocating means;
and wherein:
said support plate is connected at a rear end to said housing and has a greater height adjacent said rear end than at a forward end;
each saw blade comprises a thin metal strip having a thickness in the range of 1 mm to 2 mm; and
said support plate has a resistance against bending which is in the range of 7.5 to 30 times larger than the resistance against bending of either saw blade.

22. A portable power saw, comprising:
a housing;
an electric motor supported in said housing and having an armature shaft extending downwardly;
two elongate saw blades arranged adjacent and parallel to each other;
said saw blades having teeth along bottom edges;
means, driven by said armature shaft, for oppositely reciprocating the saw blades in a longitudinal direction;
means for generating forces to force said saw blades together at their teeth upon engagement of the saw blades in operation with a workpiece being cut;
said saw blades having outer surfaces formed with longitudinal shoulders, said shoulders extending in said longitudinal direction and facing upwardly away from said bottom edges of said saw blades;
a support plate having spaced apart lower supporting sections defining a receiving slot therebetween, said saw blades being received in said receiving slot with lower edges of said supporting sections supportingly engaging said shoulders of said saw blades with a free space remaining in said slot above upper edges of the saw blades;
said generating means comprising said teeth, said lower edges of said supporting sections and said shoulders of the saw blades, reaction forces generated on said saw blade shoulders by said lower edges of said supporting sections together with reaction forces acting on said teeth upon engagement in operation with a workpiece generating resultant inwardly directed torque forces on portions of the blades below said shoulders to force the saw blades together in the area of said teeth;
a gear casing in said housing and containing said reciprocating means;
said gear casing having an upwardly extending projection disposed forwardly of said motor;
a rear end of said support plate being mounted on and secured to said projection;
said reciprocating means comprising two saw blade holders to which the saw blades are releasably secured, and a gear disposed between the saw blade holders;
each saw blade holder having intersecting longitudinal and transverse slots, a shaft of said gear and a lower end of said armature shaft both extending through each longitudinal slot;
said armature shaft rotating a pinion drivingly meshing with said gear;
a pair of eccentric pins mounted on said gear diametrically opposite each other with respect to said gear shaft; and
a pair of elongate sliding pieces mounted on said pins, each sliding piece slidable engaging in the transverse slot of a respective one of said saw blade holders.

23. The saw of claim 22, wherein:
said support plate comprises two separate but connected plate portions each having an outwardly extending step therein along the length thereof with said supporting sections depending downwardly from the steps;
said saw blades each comprises outer and inner plates spot welded together, upper edges of the outer plates forming said shoulders and upper portions of the inner plates extending upwardly above said shoulders into said receiving slot;
each saw blade has a thickness across its inner and outer plates in the range of 1 mm to 2 mm; and
said support plate has a resistance against bending which is in the range of 10 to 25 times larger than the resistance against bending of either saw blade.

* * * * *